(12) United States Patent
Komatsu et al.

(10) Patent No.: US 10,442,412 B2
(45) Date of Patent: Oct. 15, 2019

(54) METHOD FOR CONTROLLING BRAKING DEVICE AND BRAKING CONTROL DEVICE

(71) Applicant: Nissan Motor Co., Ltd., Yokohama-shi, Kanagawa (JP)

(72) Inventors: Gakushi Komatsu, Kanagawa (JP); Yasuhiro Suzuki, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 15/740,380

(22) PCT Filed: Jul. 10, 2015

(86) PCT No.: PCT/JP2015/069908
§ 371 (c)(1),
(2) Date: Dec. 28, 2017

(87) PCT Pub. No.: WO2017/009899
PCT Pub. Date: Jan. 19, 2017

(65) Prior Publication Data
US 2018/0186348 A1 Jul. 5, 2018

(51) Int. Cl.
*B60T 7/20* (2006.01)
*B60T 7/22* (2006.01)
*B60T 7/12* (2006.01)
*B60T 13/66* (2006.01)
*B60T 15/46* (2006.01)
*B60T 17/22* (2006.01)

(52) U.S. Cl.
CPC ............... *B60T 7/20* (2013.01); *B60T 7/128* (2013.01); *B60T 7/22* (2013.01); *B60T 13/665* (2013.01); *B60T 15/46* (2013.01); *B60T 17/228* (2013.01); *Y02T 10/7258* (2013.01)

(58) Field of Classification Search
CPC ... B60T 7/20; B60T 7/128; B60T 7/22; B60T 17/228; B60T 13/665; B60T 15/46
See application file for complete search history.

(56) References Cited

U.S. PATENT DOCUMENTS 5,238,298 A * 8/1993 Wagner .................. B60T 13/22
188/170
5,927,822 A 7/1999 Hart
(Continued)

FOREIGN PATENT DOCUMENTS

| CN | 204150058 U | 2/2015 |
| FR | 2 774 343 A1 | 8/1999 |
| JP | 9-136625 A | 5/1997 |

(Continued)

*Primary Examiner* — Xuan Len Nguyen
(74) *Attorney, Agent, or Firm* — Global IP Counselors, LLP

(57) ABSTRACT

A method is provided for controlling a braking device which controls a braking force of towed vehicles in a combination vehicle which includes a towing vehicle and a plurality of towed vehicles towed by the towing vehicle, and in which the towing vehicle and the towed vehicle are coupled by a coupler and the towed vehicles are coupled by couplers. In the method for controlling the braking device, after the towed vehicle that is located on a rearmost side is made not to move, imparting a braking force to the plurality of towed vehicles towed by the towing vehicle starting in order from the towed vehicle located on a rear side.

5 Claims, 6 Drawing Sheets

(56) References Cited

U.S. PATENT DOCUMENTS

| | | | | |
|---|---|---|---|---|
| 6,273,521 B1* | 8/2001 | Halvorson | ............... | B60T 7/22 |
| | | | | 303/3 |
| 2014/0062178 A1* | 3/2014 | Panse | ...................... | B60T 7/20 |
| | | | | 303/18 |

FOREIGN PATENT DOCUMENTS

| JP | 10-29537 A | 2/1998 |
|---|---|---|
| JP | 2004-49000 A | 2/2004 |
| JP | 2010-259282 A | 11/2010 |
| WO | 2010/125773 A1 | 11/2010 |

* cited by examiner

US 10,442,412 B2

METHOD FOR CONTROLLING BRAKING DEVICE AND BRAKING CONTROL DEVICE

CROSS-REFERENCE TO RELATED APPLICATIONS

This application is a U.S. National stage application of International Application No. PCT/JP2015/069908, filed Jul. 10, 2015.

BACKGROUND

Field of the Invention

The present invention relates to a method for controlling a braking device and a braking control device for controlling the braking force of a plurality of towed vehicles that are towed by a towing vehicle.

Background Information

In a technique for controlling a combination vehicle, which comprises a towing vehicle and a plurality of towed vehicles, it is required that shocks and vibrations of the towed vehicles that are generated due to elongation of couplers that connect the combination vehicle be suppressed at the time of starting the combination vehicle.

For example, a technique is known in which, in a locomotive that tows passenger cars, when the locomotive accelerates in order to start, an increase in acceleration is suppressed immediately after acceleration is started, and the acceleration is increased after a certain amount of tensile load is applied between the passenger cars, in order to ameliorate sudden changes in the torque that are generated by the passenger cars (Japanese Laid-Open Patent Application No. 2004-49000 referred to herein as Patent Document 1).

SUMMARY

However, in the prior art described above, since an increase in acceleration is suppressed for a while after starting acceleration of the locomotive, there is the problem that the initial movement of the locomotive is delayed and that it takes a long time until the locomotive reaches the target acceleration.

The problem to be solved by the present invention is how promptly to accelerate a combination vehicle while suppressing shocks and vibrations of the towed vehicles when starting the combination vehicle.

The present invention solves the problem described above by controlling the timing at which braking force is imparted to the towed vehicles when the towing vehicle starts, in a combination vehicle in which a towing vehicle and the towed vehicle or vehicles, are respectively coupled to each other by couplers.

According to the present invention, since braking force is imparted starting in order from a towed vehicle located on a rear side when the towing vehicle starts, the couplers are elongated to an appropriate length in a short period of time. As a result, the couplers are in an appropriately elongated state at the point in time in which the towing vehicle starts to accelerate in order to start, and it becomes possible for the combination vehicle to start while suppressing shocks and vibrations of the towed vehicles and to promptly accelerate the combination vehicle.

BRIEF DESCRIPTION OF THE DRAWINGS

Referring now to the drawings, a braking control device of a combination vehicle is illustrated.

DETAILED DESCRIPTION OF THE EMBODIMENTS

The combination vehicle comprising the braking control device according to an embodiment of the present invention will be described below, based on the drawings.

Figure 1:
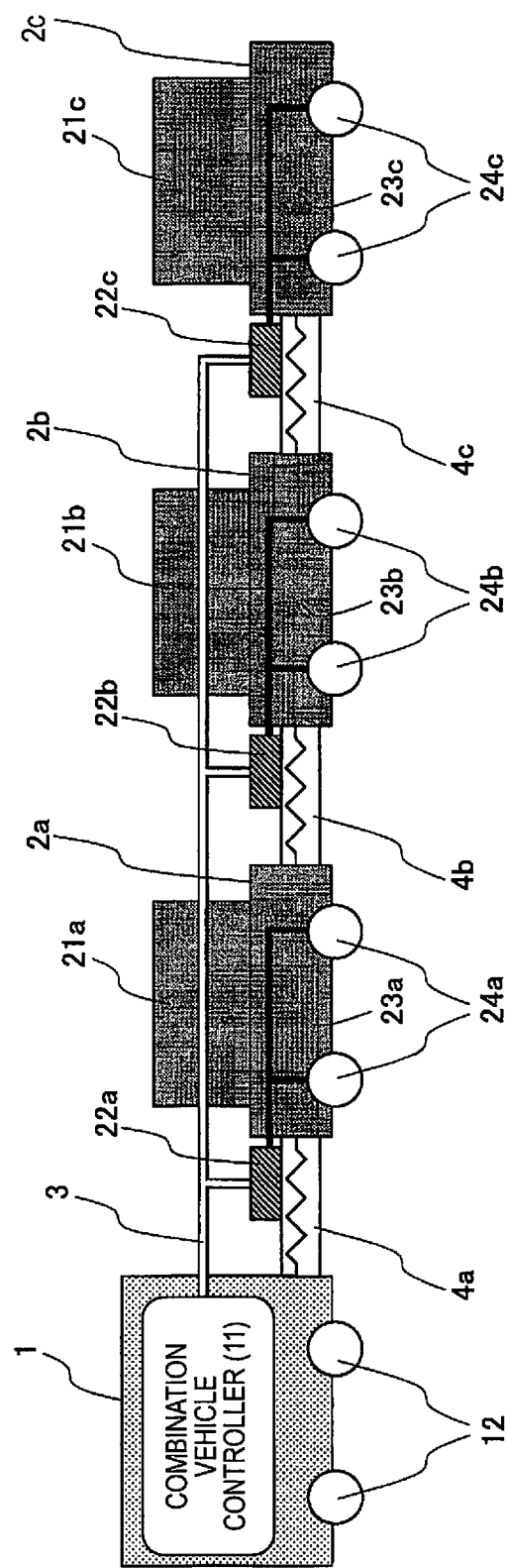
FIG. 1 is a schematic view illustrating one example of a combination vehicle comprising the braking control device according to an embodiment of the present invention.

FIG. 1 is a schematic view illustrating a scenario in which a towing vehicle 1 comprising the braking control device 111 of the present embodiment is attempting to start a combination vehicle comprising the towing vehicle 1 and towed vehicles 2a-2c, while towing three towed vehicles 2a-2c. In the present embodiment, the configuration of the combination vehicle is realized by the respectively coupling of the towing vehicle 1 and the towed vehicles 2a-2c via couplers 4a-4c. Specifically, the configuration of the combination vehicle is realized by the coupling of the towing vehicle 1 and a towed vehicle 2a via a coupler 4a, the coupling of the towed vehicle 2a and a towed vehicle 2b via a coupler 4b, and the coupling of the towed vehicle 2b and a towed vehicle 2c via a coupler 4c. Loads 21a-21c are respectively loaded on the towed vehicles 2a-2c. In FIG. 1, an example is shown in which there are three towed vehicles; however, the number of towed vehicles is not limited and may be any number greater than or equal to two.

The towing vehicle 1 and the towed vehicles 2a-2c, which configure the combination vehicle, are not particularly limited, and may be automobiles that can travel on roads, or railroad cars that travel on rails. In addition, the towing vehicle 1 may be any vehicle that can travel while towing towed vehicles 2a-2c, and includes, for example, vehicles that travel using an electric motor, an internal combustion engine, a steam engine, or the like as the prime mover.

In the present embodiment, the couplers 4a-4c are not particularly limited, and in the example illustrated in FIG. 1, couplers that can expand and contract in accordance with the acceleration of the towing vehicle 1 are used. That is, the couplers 4a-4c are capable of expanding in accordance with the acceleration of the towing vehicle 1 and are capable of contracting in accordance with the deceleration of the towing vehicle 1. For example, elastic members are incorporated in the couplers 4a-4c, and it is possible to cause the couplers 4a-4c to expand and contract by the elastic members expanding and contracting in accordance with the acceleration of the towing vehicle 1.

The towing vehicle 1 is provided with a combination vehicle controller 11 for controlling the driving and braking of the combination vehicle, and a driving unit 12 for driving the towing vehicle 1, as illustrated in FIG. 1. The combination vehicle controller 11 is connected to control devices 22a-22c, which are respectively provided to the towed vehicles 2a-2c, via a coupling circuit 3, as illustrated in FIG. 1. The control devices 22a-22c that are connected to the combination vehicle controller 11 are able to respectively operate brakes 24a-24c of the towed vehicles 2a-2c via brake operating circuits 23a-23c to impart braking force to the wheels of the towed vehicles 2a-2c.

The brakes 24a-24c are not particularly limited, and it is possible to use a disc brake or a drum brake, which are operated by controlling the fluid pressure of a fluid (oil, compressed air, or the like) with the control devices 22a-22c. Alternatively, the brakes 24a-24c may impart braking force without depending on fluid pressure, and, for example, an electric brake device may be used.

Figure 2:
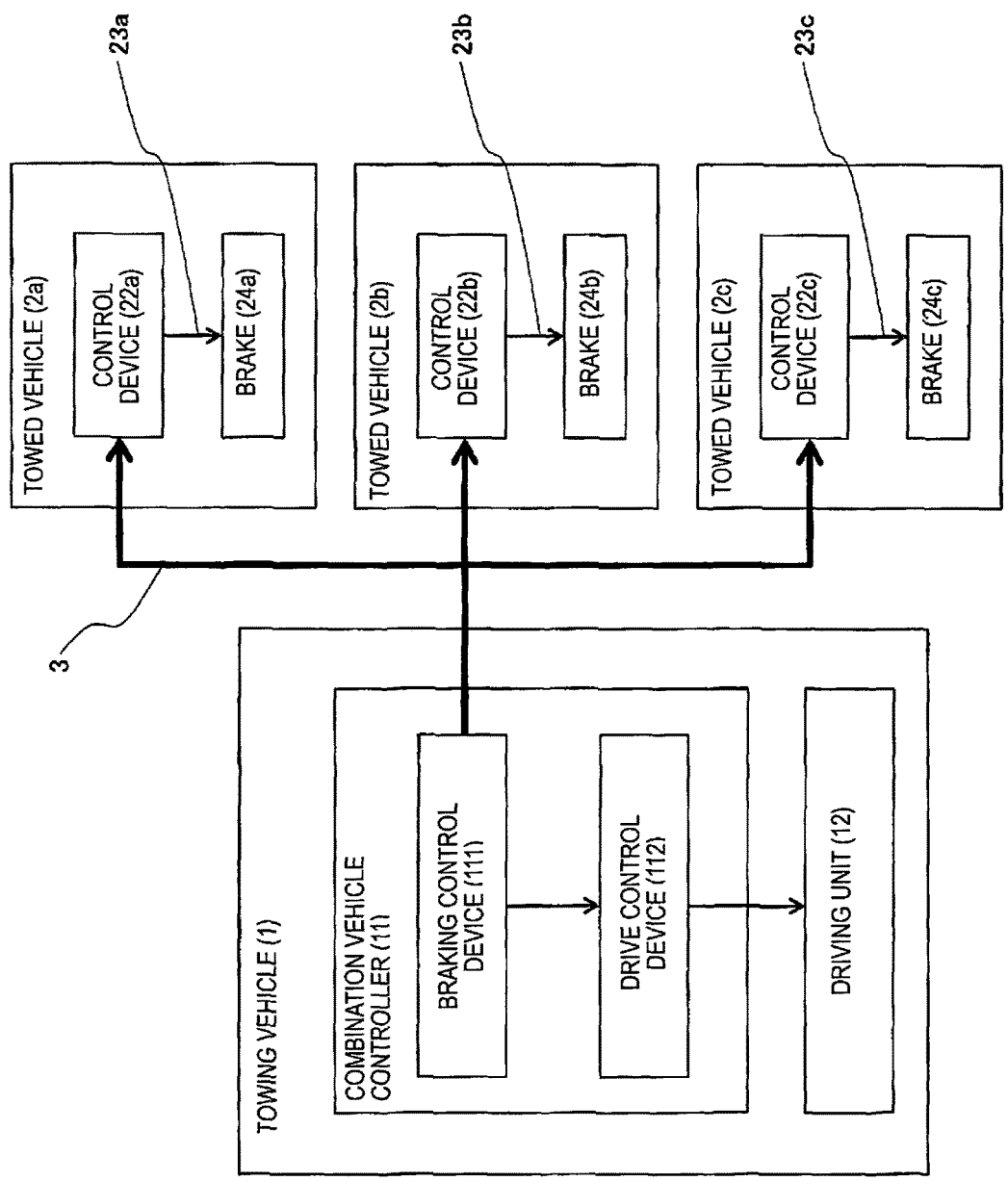
FIG. 2 is a block diagram of the combination vehicle comprising the braking control device according to an embodiment of the present invention.

Here, FIG. 2 is a block diagram of the combination vehicle of the present embodiment. The combination vehicle controller 11 of the towing vehicle 1 is provided with a braking control device 111 for imparting braking force to the towed vehicles 2a-2c and a drive control device 112 for driving the driving unit 12 of the towing vehicle 1 in order to accelerate the towing vehicle 1, as illustrated in FIG. 2. In the present embodiment, as described above, the braking control device 111 provided relative to the combination vehicle controller 11 instructs the control devices 22a-22c of the towed vehicles 2a-2c via the coupling circuit 3 to operate the brakes 24a-24c to impart braking force to the towed vehicles 2a-2c. Although not shown in FIGS. 1 and 2, a brake may be provided to the towing vehicle 1, and the braking control device 111 may operate the brake of the towing vehicle 1 to impart braking force to the towing vehicle 1.

In the present embodiment, the following control is carried out in a combination vehicle having such a configuration. That is, while the combination vehicle is stopped before the combination vehicle is started, the braking control device 111 sequentially imparts braking force to each of the towed vehicles, i.e., with respect to the towed vehicles 2a-2c, and drives the driving unit 12 of the towing vehicle 1. It is thereby possible to elongate the length of the couplers 4a-4c up to an expansion amount that corresponds to when the towing vehicle 1 is accelerated at the target acceleration, at the point in time in which the combination vehicle is actually started. That is, since the couplers 4a-4c expand and contract in accordance with the acceleration of the towing vehicle 1, as described above, in the present embodiment, by imparting braking force to the towed vehicles 2a-2c when the combination vehicle starts, it is possible to elongate the couplers 4a-4c up to a length that corresponds to when the towing vehicle 1 is accelerated at the target acceleration. At this time, the braking control device 111 applies a greater braking force to the towed vehicles 2a-2c, as the tensile load that is predicted to be applied to the couplers 4a-4c, when the towing vehicle 1 is accelerated at the target acceleration, becomes greater. It is thereby possible to expand the couplers 4a-4c to an appropriate length.

Thereafter, in the present embodiment, all of the braking forces that are imparted to the towed vehicles 2a-2c are released, and the towing vehicle 1 is driven to start the combination vehicle. Since the combination vehicle is thereby started in a state in which the couplers 4a-4c are appropriately expanded, it becomes possible to promptly accelerate a combination vehicle while suppressing shocks and vibrations of the towed vehicles 2a-2c, which are generated due to expansion and contraction of the couplers 4a-4c.

Figure 3A:
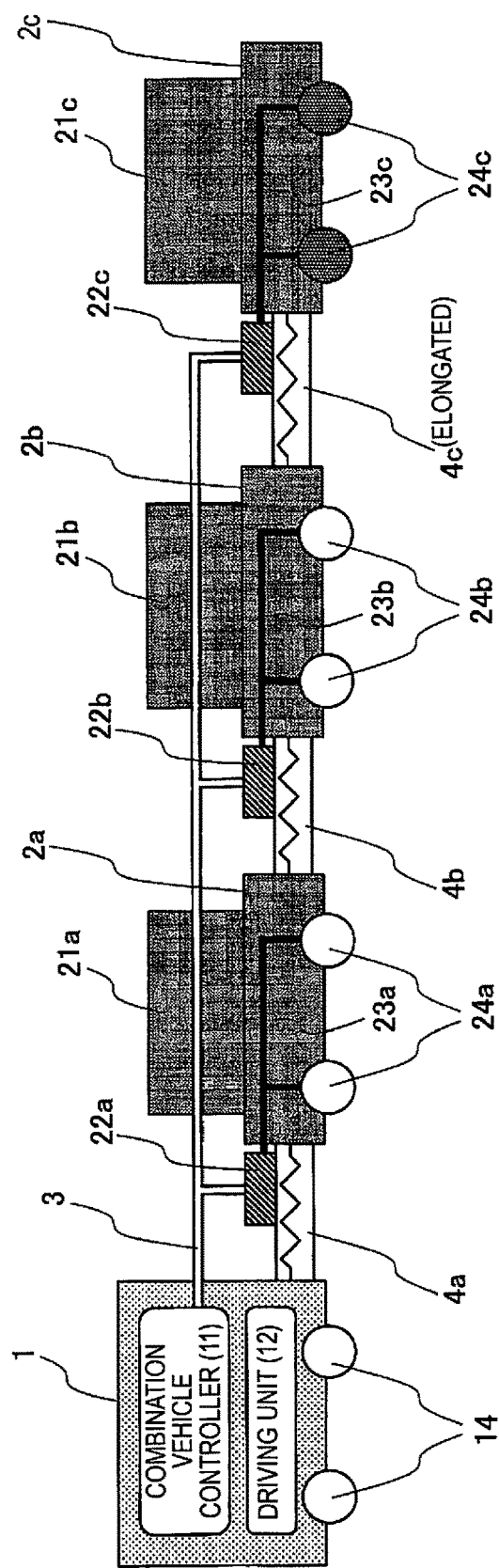
FIG. 3A is a schematic view (part 1) illustrating one example of a method for imparting braking force to towed vehicles by the braking control device according to an embodiment of the present invention.
Figure 3B:
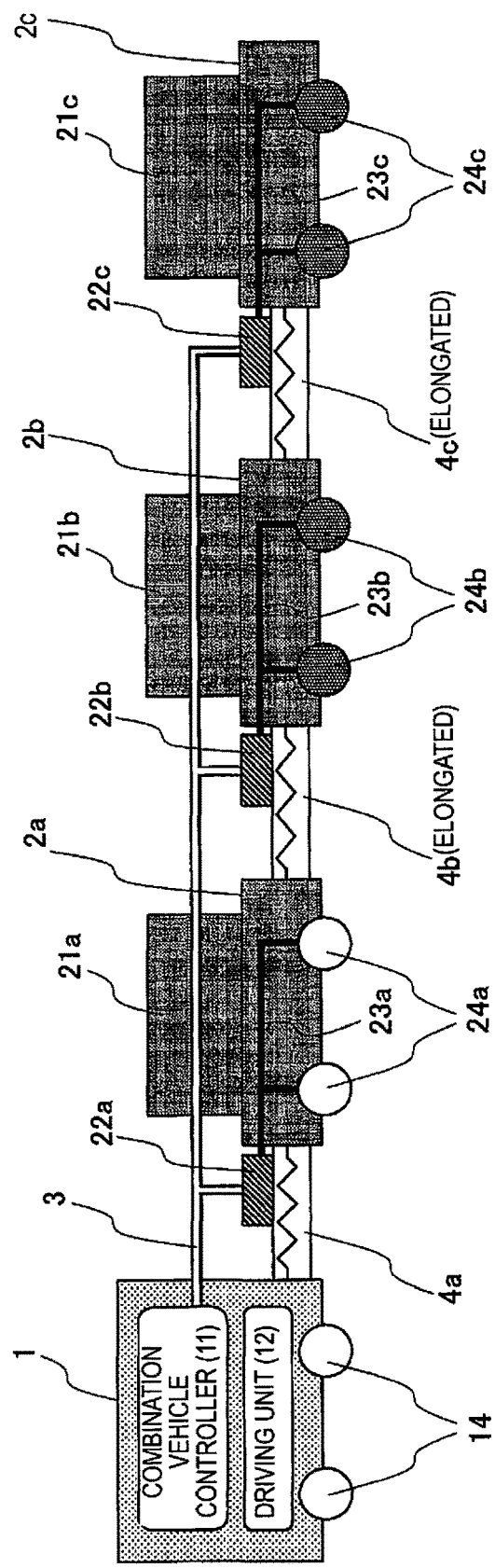
FIG. 3B is a schematic view (part 2) illustrating one example of a method for imparting braking force to towed vehicles by the braking control device according to an embodiment of the present invention.
Figure 3C:
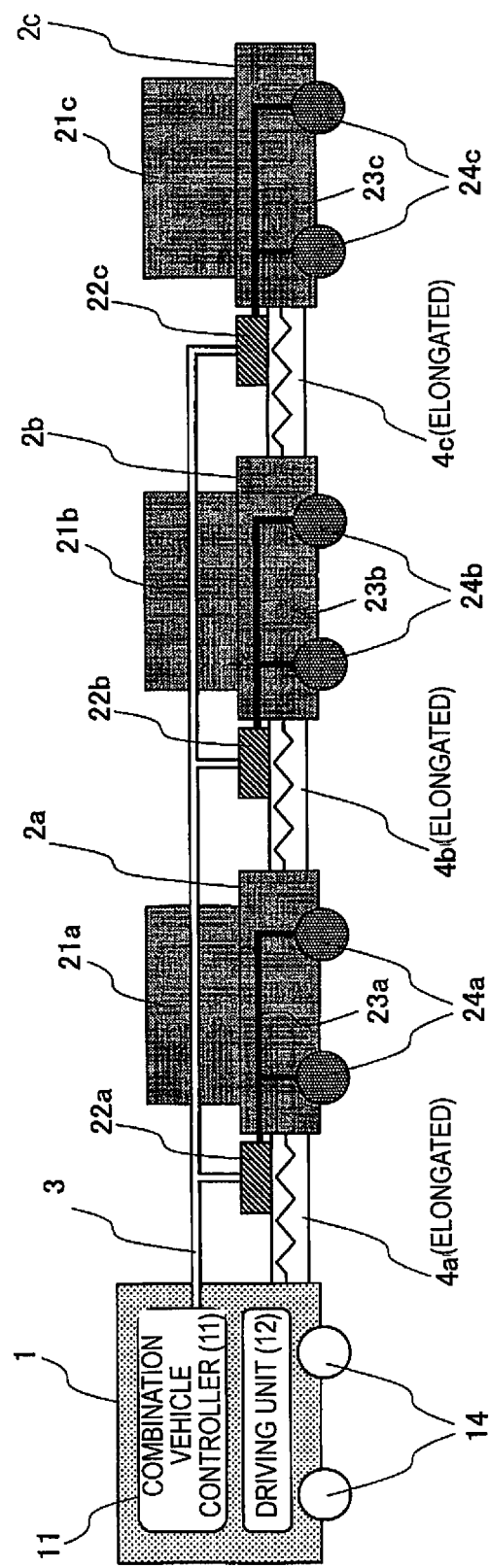
FIG. 3C is a schematic view (part 3) illustrating one example of a method for imparting braking force to towed vehicles by the braking control device according to an embodiment of the present invention.
Figure 4:
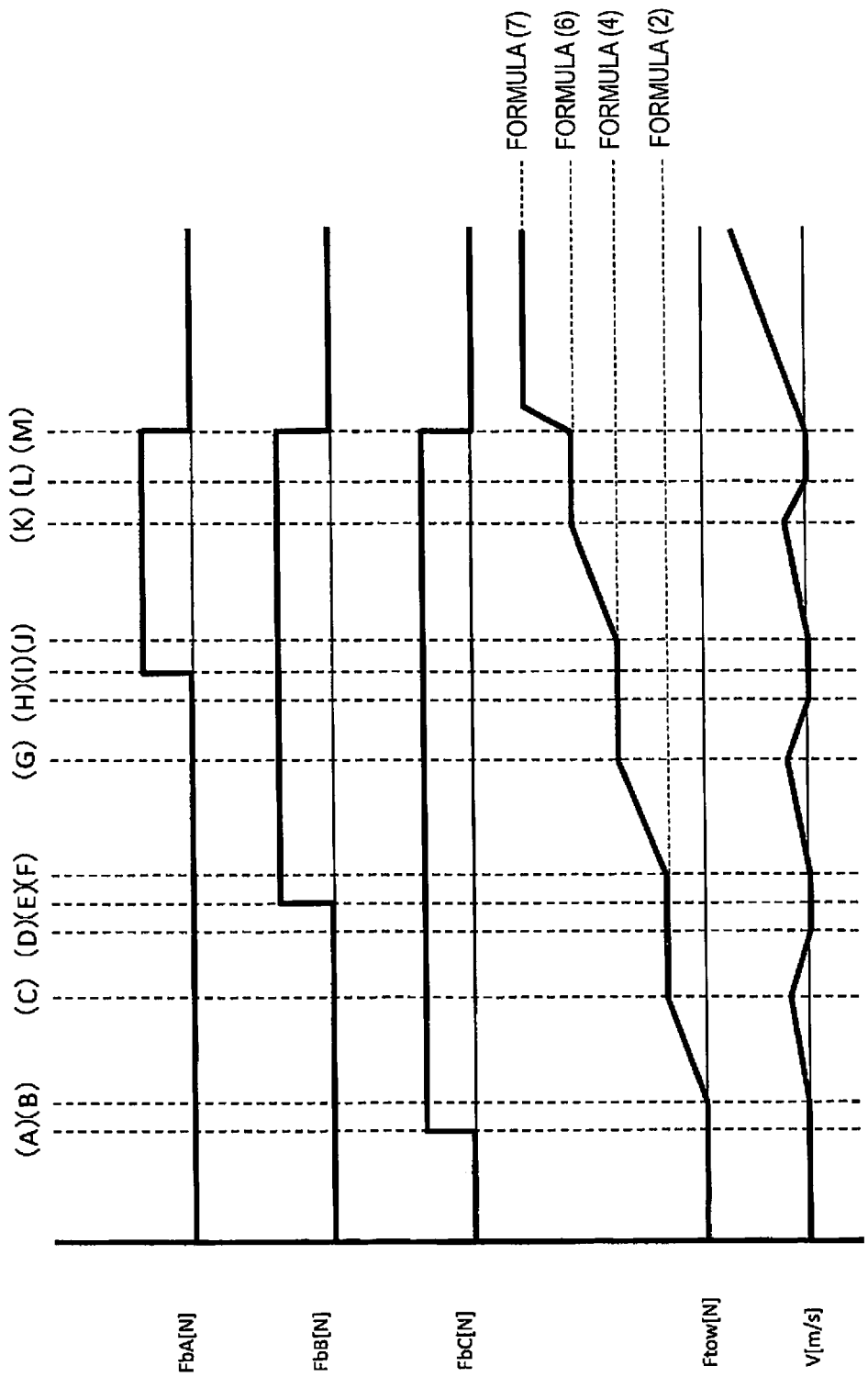
FIG. 4 is a timing chart illustrating one example of timing with which braking force is imparted to towed vehicles by the braking control device according to an embodiment of the present invention.

Here, one example of a method for imparting braking force to towed vehicles 2a-2c via the braking control device 111 when starting the combination vehicle will be described with reference to FIGS. 3A-3C and FIG. 4. FIGS. 3A-3C are schematic views illustrating the state of the combination vehicle when imparting braking force to the towed vehicles 2a-2c, and the brakes 24a-24c to which braking force is imparted are indicated by shading. In addition, FIG. 4 is a timing chart illustrating the timing with which braking force is imparted to the towed vehicles 2a-2c, and the timing with which the towing vehicle 1 is caused to generate pulling force. FIG. 4 also illustrates changes in the speed of the towing vehicle 1 due to the expansion of couplers 4a-4c caused by the towing vehicle 1 generating pulling force.

In the scenario shown in FIGS. 3A-3C, it is assumed that the coefficient of rolling resistance of the wheels of the towed vehicles 2a-2c is respectively μA, μB, and μC, that the total weight of the towed vehicles 2a-2c including loads 21a-21c is respectively MA, MB, and MC, and that the towing vehicle 1 is attempting to start the combination vehicle at a target acceleration of $a_{ref}$ (unit is m/s$^2$.).

In the present embodiment, at the timing of (A) of the timing chart shown in FIG. 4, the braking control device 111 applies a braking force FbC to the towed vehicle 2c located on a rearmost side of the combination vehicle by operation of the brake 24c, as illustrated in FIG. 3A. Here, the braking force FbC that is applied to the towed vehicle 2c shall be the value shown in formula (1) below (units are N.).

$$FbC \geq MC \cdot a_{ref} + \mu C \cdot MC \quad (1)$$

Next, at the timings of (B)-(C) shown in FIG. 4, the driving unit 12 is driven by the drive control device 112 of the towing vehicle 1, and the pulling force Ftow of the towing vehicle 1 is increased to the value shown in formula (2) below (units are N.).

$$Ftow = MC \cdot a_{ref} + \mu C \cdot MC \quad (2)$$

In this manner, in the present embodiment, braking force is imparted to the towed vehicle 2c such that the towed vehicle 2c will not move at the timing of (A) in FIG. 4; thereafter, the towing vehicle 1 generates a pulling force Ftow to a degree that will accelerate the towed vehicle 2c at the target acceleration $a_{ref}$, at the timings of (B)-(C) shown in FIG. 4. As a result, the tensile load that is applied to the coupler 4c, which is connected to the towed vehicle 2c, reaches a threshold value $N_{4c}$ that is set in advance with respect to the coupler 4c (value of the tensile load that is predicted to be applied to the coupler 4c when the combination vehicle is accelerated at the target acceleration $a_{ref}$), and the coupler 4c will expand to a length that is equivalent to the case in which the combination vehicle is accelerated at the target acceleration $a_{ref}$. In this case, during the period between (B)-(C) shown in FIG. 4, the towing vehicle 1 moves forward due to the elongation of the coupler 4c, and the speed V (units are m/s) increases slightly. Thereafter, since the expansion of the coupler 4c stops, the speed of the towing vehicle 1 decreases during the period between (C)-(D) shown in FIG. 4, and the towing vehicle 1 eventually stops.

Subsequently, in the present embodiment, at the timing of (E) in the timing chart shown in FIG. 4, the braking control device 111 applies a braking force FbB to the towed vehicle 2b by operation of the brake 24b, as illustrated in FIG. 3B. Here, the braking force FbB that is applied to the towed vehicle 2b shall be the value shown in formula (3) below.

$$FbB \geq (MC+MB) \cdot a_{ref} + \mu C \cdot MC + \mu B \cdot MB \quad (3)$$

Next, at the timings of (F)-(G) shown in FIG. 4, the driving unit 12 is driven by the drive control device 112 of the towing vehicle 1, and the pulling force Ftow of the towing vehicle 1 is increased to the value shown in formula (4) below.

$$Ftow = (MC+MB) \cdot a_{ref} + \mu C \cdot MC + \mu B \cdot MB \quad (4)$$

In this manner, in the present embodiment, braking force is imparted to the towed vehicle 2b such that the towed vehicle 2b will not move at the timing of (E) in FIG. 4; thereafter, the pulling force Ftow of the towing vehicle 1 is increased to a degree at which it is possible to accelerate the towed vehicle 2c and the towed vehicle 2b at the target acceleration $a_{ref}$ at the timings of (F)-(G) shown in FIG. 4. As a result, the tensile load that is applied to the coupler 4b, which is connected to the towed vehicle 2b, reaches a threshold value Nab that is set in advance with respect to the coupler 4b (value of the tensile load that is predicted to be applied to the coupler 4b when the combination vehicle is accelerated at the target acceleration $a_{ref}$), and the coupler 4b will expand to a length that is equivalent to the case in which the combination vehicle is accelerated at the target acceleration $a_{ref}$. In this case, during the period between (F)-(G) shown in FIG. 4, the towing vehicle 1 moves forward due to the elongation of the coupler 4b, and the speed V increases slightly. Thereafter, since the expansion of the coupler 4b stops, the speed of the towing vehicle 1 decreases during the period between (G)-(H) shown in FIG. 4, and the towing vehicle 1 eventually stops.

Subsequently, in the present embodiment, at the timing of (I) in the timing chart shown in FIG. 4, the braking control device 111 applies a braking force FbA to the towed vehicle 2a by operation of the brake 24a, as illustrated in FIG. 3C. Here, the braking force FbA that is applied to the towed vehicle 2a shall be the value shown in formula (5) below.

$$FbB \geq (MC+MB+MC) \cdot a_{ref} + \mu C \cdot MC + \mu B \cdot MB + \mu A \cdot MA \quad (5)$$

Next, at the timings of (J)-(K) shown in FIG. 4, the driving unit 12 is driven by the drive control device 112 of the towing vehicle 1, and the pulling force Ftow of the towing vehicle 1 is increased to the value shown in formula (6) below.

$$Ftow = (MC+MB+MC) \cdot a_{ref} + \mu C \cdot MC + \mu B \cdot MB + \mu A \cdot MA \quad (6)$$

In this manner, in the present embodiment, braking force is imparted to the towed vehicle 2a such that the towed vehicle 2a will not move at the timing of (I) in FIG. 4; thereafter, the pulling force Ftow of the towing vehicle 1 is increased to a degree with which it is possible to accelerate the towed vehicles 2a-2c at the target acceleration $a_{ref}$ at the timings of (J)-(K) shown in FIG. 4. As a result, the tensile load that is applied to the coupler 4a, which is connected to the towed vehicle 2a, reaches a threshold value $N_{4a}$ that is set in advance with respect to the coupler 4a (value of the tensile load that is predicted to be applied to the coupler 4a when the combination vehicle is accelerated at the target acceleration $a_{ref}$), and the coupler 4a will expand to a length that is equivalent to the case in which the combination vehicle is accelerated at the target acceleration $a_{ref}$. In this case, during the period between (J)-(K) shown in FIG. 4, the towing vehicle 1 moves forward due to the elongation of the coupler 4a, and the speed V increases slightly. Thereafter, since the expansion of the coupler 4a stops, the speed of the towing vehicle 1 decreases during the period between (K)-(L) shown in FIG. 4, and the towing vehicle 1 eventually stops.

Thereafter, in the present embodiment, all of the braking forces that are imparted to the towed vehicles 2a-2c are released at the timing of (M) in FIG. 4, and the pulling force Ftow of the towing vehicle 1 is increased to the value shown in formula (7) below.

$$Ftow = (MC+MB+MC) \cdot a_{ref} + \mu C \cdot MC + \mu B \cdot MB + \mu A \cdot MA + \mu tow \cdot Mtow \quad (7)$$

Here, μtow is the coefficient of rolling resistance of the wheels of the towing vehicle 1, and Mtow is the total weight of the towing vehicle 1.

As a result, it is possible to accelerate the combination vehicle at the target acceleration $a_{ref}$ in a state in which the expansion amount of the couplers 4a-4c of the combination vehicle is set to the same expansion amount as the case in which the combination vehicle is accelerated at the target acceleration $a_{ref}$.

In the present embodiment, as described above, a predetermined braking force is sequentially imparted to the towed vehicles 2a-2c before the combination vehicle is started, while increasing the pulling force of the towing vehicle 1 in a stepwise manner. In this case, the tensile loads that are applied to the couplers 4a-4c of the combination vehicle are configured to respectively reach predetermined threshold values, which are set for each coupler, in a state in which the pulling force of the towing vehicle 1 and the braking forces of the towed vehicles 2a-2c are in a balanced state (that is, applying larger braking forces to the towed vehicles 2a-2c, as the tensile loads that will be applied to the couplers 4a-4c by the pulling force of the towing vehicle 1 are increased). As a result, the expansion amount of the couplers 4a-4c can be made equal to the case in which the combination vehicle is accelerated at the target acceleration $a_{ref}$. Therefore, in the present embodiment, the couplers 4a-4c will be appropriately elongated before the combination vehicle is actually started, and by further increasing the pulling force of the towed vehicle 1 in this state to actually start the combination vehicle, it is possible to appropriately suppress shocks and vibrations of the towed vehicles 2a-2c, which are caused by expansion and contraction of the couplers 4a-4c when the combination vehicle is started.

As a technique for suppressing shocks and vibrations of such towed vehicles, conventionally, a technique is known in which an increase in acceleration is suppressed immediately after a combination vehicle accelerates in order to start, and, thereafter, the acceleration is increased after a certain amount of tensile load is applied between the towed vehicles. However, in the prior art described above, since an increase in acceleration is suppressed for a while after starting acceleration of the combination vehicle, the initial motion of the combination vehicle is delayed, and a long period of time is required until the combination vehicle reaches a target acceleration.

In contrast, in the present embodiment, by imparting braking force to the towed vehicles 2a-2c before the combination vehicle is actually started, while increasing the pulling force of the towing vehicle 1 in a stepwise manner, it is possible to bring the expansion of the couplers 4a-4c of the combination vehicle to appropriate levels in a shorter amount of time. It is thereby possible to promptly accelerate the combination vehicle while suppressing shocks and vibrations that occur in the towed vehicles 2a-2c when starting the combination vehicle.

In the example described above, an example was shown in which braking force is imparted in order from the towed vehicle that is located on the rear side of the combination vehicle, that is, in the order of the towed vehicle 2c, the towed vehicle 2b, and the towed vehicle 2a; however, the order in which braking force is imparted is not limited to this example. In addition, in the present embodiment, the number of towed vehicles to which braking force is imparted is also not particularly limited, and it is sufficient if braking force is applied to at least one towed vehicle. For example, in the combination vehicle illustrated in FIG. 1, braking force may be imparted to only two towed vehicles, the towed vehicle 2b and the towed vehicle 2a, in the order of the towed vehicle 2b and the towed vehicle 2a. In this case, the coupler 4b connected to the towed vehicle 2b, and the coupler 4a connected to the towed vehicle 2a will be elongated. Alternatively, in the combination vehicle illustrated in FIG. 1, braking force may be imparted only to the towed vehicle 2c. In this case, the coupler 4c connected to the towed vehicle 2c will be elongated.

Additionally, in the present embodiment, when stopping a combination vehicle that has started and is traveling to a desired location, the combination vehicle may be stopped in front of the target stopping location, which is set in advance, in preparation for the next departure. As a result, in a scenario in which a stopped combination vehicle is subsequently started, it is possible to prevent the location of the combination vehicle from exceeding the target stopping location, even when the combination vehicle moves forward due to the expansion of the couplers, when carrying out a control of the combination vehicle as shown in FIGS. 3A-3C and FIG. 4 described above.

Since the combination vehicle of the present embodiment is configured and operated as described above, the following effects are obtained.

(1) According to the present embodiment, when a combination vehicle is started, braking force is imparted in order from a towed vehicle that is located on the rear side, of a plurality of towed vehicles that are towed by a towing vehicle. In this case, when the tensile loads that are imparted to couplers that are connected to the respective towed vehicles reach predetermined threshold values that are set in advance for each coupler, all of the braking forces that are imparted to the towed vehicles are released. As a result, each coupler is elongated to a length that is equivalent to the case in which the combination vehicle is accelerated at a target acceleration $a_{ref}$, at the point in time at which the towing vehicle starts to accelerate in order to start, and it becomes possible to promptly accelerate the combination vehicle while suppressing shocks and vibrations of the towed vehicles.

(2) According to the present embodiment, since a larger braking force is imparted to the towed vehicles that are connected to the couplers, as the tensile loads that will be applied to the couplers are increased, it is possible to more appropriately elongate the couplers before the combination vehicle is started; therefore, shocks and vibrations of the towed vehicles are more significantly suppressed.

(3) According to the present embodiment, since application of braking force to the towed vehicles is carried out while the towed vehicles are stopped, it is possible to elongate the couplers to an appropriate length in a short period of time, before the combination vehicle is started.

(4) According to the present embodiment, when stopping a combination vehicle that has started at a desired location, braking force is imparted to the towed vehicles such that the combination vehicle is stopped in front of a target stopping location, which is set in advance. As a result, when subsequently starting the combination vehicle, even if the combination vehicle moves forward due to the expansion of the couplers, via the control as shown in FIGS. 3A-3C and FIG. 4 described above, the combination vehicle will not exceed the target stopping location before starting, and it is possible to smoothly carry out the subsequent starting of the combination vehicle.

(5) The actions and effects described above are obtained in accordance with the braking control device of the present embodiment.

Embodiments of the present invention were described above, but these embodiments are described in order to facilitate understanding of the present invention and are not described in order to limit the present invention. Therefore, the elements disclosed in the embodiments above are intended to include all design modifications and equivalents thereto that lie within the technical range of the present invention.

In the embodiment described above, the brakes 24a-24c of the towed vehicles 2a-2c correspond to the brake device of the present invention, and the braking control device 111 of the towing vehicle 1 corresponds to the braking control device of the present invention.

The invention claimed is:

1. A method for controlling a braking device which controls braking forces of towed vehicles in a combination vehicle having a towing vehicle and a plurality of the towed vehicles being towed by the towing vehicle when starting the combination vehicle from a standstill, and in which coupling between the towing vehicle and the towed vehicle and coupling between the towed vehicles are carried out by couplers, comprising
   after the towed vehicle that is located on a rearmost side is made not to move, imparting a separate braking force to each of the plurality of towed vehicles towed by the towing vehicle one at a time starting in order from the rearmost towed vehicle.

2. The method for controlling the braking device as recited in claim 1, wherein
   releasing all of the braking forces that are imparted to the towed vehicles when tensile loads applied to the couplers connecting respective ones of the towed vehicles reach predetermined threshold values that are set in advance for each of the couplers after one of the braking forces is imparted to at least one towed vehicle.

3. The method for controlling the braking device as recited in claim 1, wherein
   the imparting of the plurality of braking forces to the plurality of towed vehicles, respectively, is carried out such that the combination vehicle is stopped in front of a target stopping location that is set in advance when stopping the towing vehicle that is traveling.

4. The method for controlling the braking device as recited in claim 1, wherein
   the imparting of the plurality of braking forces to the plurality of towed vehicles, respectively, connected to the couplers becomes larger, as the towing forces to be applied to the couplers increases.

5. A braking control device for controlling a braking device which controls braking forces of towed vehicles in a combination vehicle having a towing vehicle and a plurality of the towed vehicles being towed by the towing vehicle when starting the combination vehicle from a standstill, and in which coupling between the towing vehicle and the towed vehicle and coupling between the towed vehicles are carried out by couplers, comprising after the towed vehicle that is located on a rearmost side is made not to move, imparting a plurality of separate braking force to each of the plurality of towed vehicles towed by the towing vehicle one at a time starting in order from the rearmost towed vehicle.

\* \* \* \* \*